UNITED STATES PATENT OFFICE.

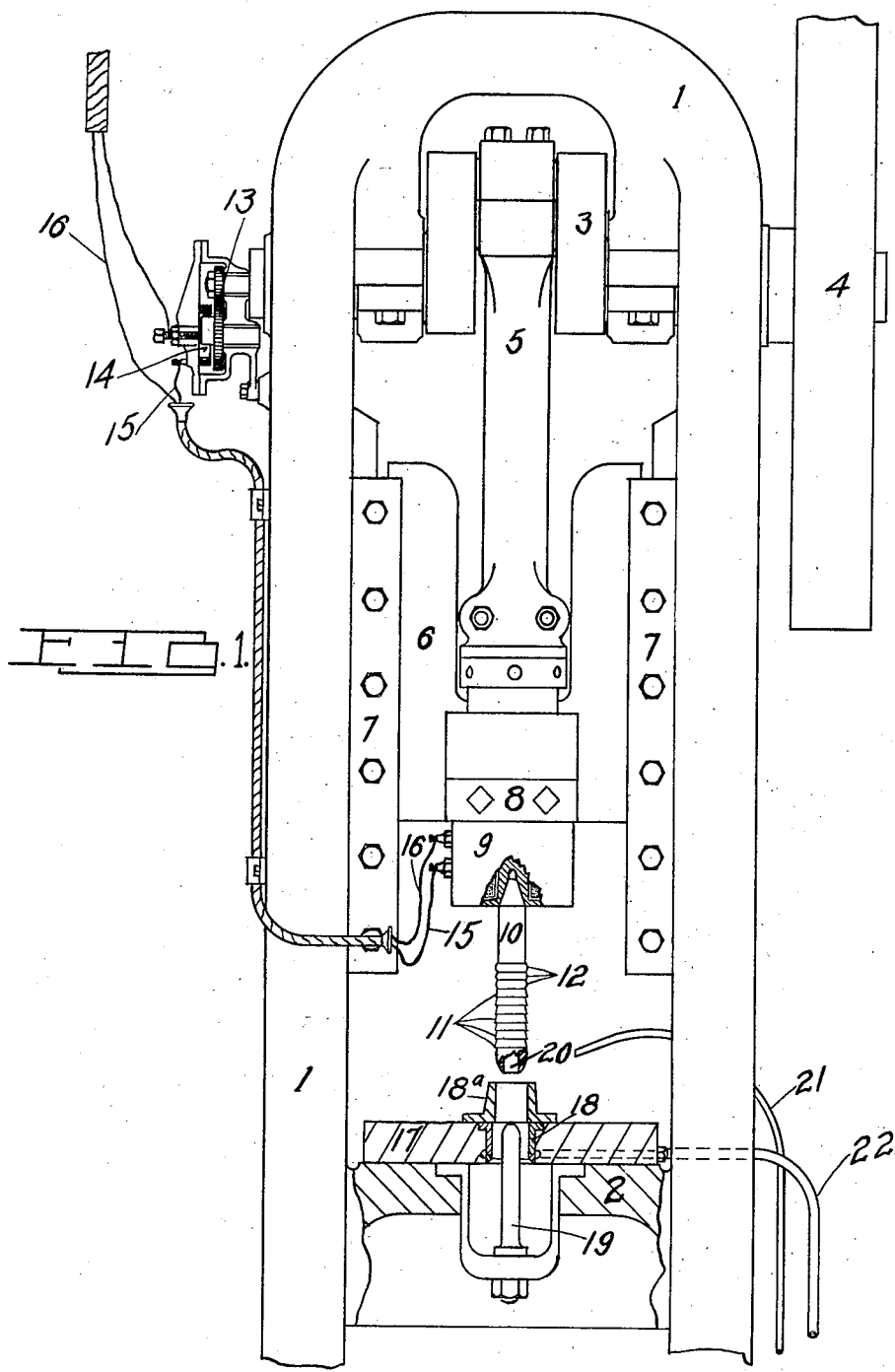

HEBRON B. LAYMAN, OF NEW YORK, N. Y.

MACHINE FOR BROACHING, BURNISHING, AND THE LIKE.

1,369,821.      Specification of Letters Patent.      Patented Mar. 1, 1921.

Application filed March 31, 1916, Serial No. 87,921. Renewed July 14, 1920. Serial No. 396,338.

*To all whom it may concern:*

Be it known that I, HEBRON B. LAYMAN, a citizen of the United States, and residing at New York, in the county of New York and State of New York, have invented certain new and useful Improvements in Machines for Broaching, Burnishing, and the like, of which the following is a specification, such as will enable those skilled in the art to which it appertains to make and use the same.

This invention relates to machines for broaching, burnishing and performing like operations.

Heretofore broaching or burnishing machines have been constructed, in which the piece to be worked upon is chucked in place in the machine, and a broaching or burnishing tool then located in place and pulled through the piece, after which the tool is released from the driving element and carried by hand back to its initial position, whereafter the cycle of operations is repeated.

Another method of broaching and burnishing is to locate a suitable tool in a machine, preferably an up-right crank press, and, pushing the tool through the piece to be operated upon, it is allowed to fall into a box or some manner of trap, after which the broach is returned to the slide by hand. In this procedure, generally two similar tools are used alternately to increase production.

The object of this invention is a provision in the machine of means for returning the broach, positively and mechanically, at the desired time, and in synchronism with the driving element.

Another object is to provide a machine in which a single tool may be used at the maximum rate of production.

Other objects will appear hereafter, set forth in the specification and the claims.

By way of example I show a machine for accomplishing these purposes, in which 1 is the frame of a crank press, having a bed 2, a crank shaft 3, fly wheel 4 therefor, connecting rod 5 connecting the shaft 3 to the slide 6, which is guided in gibbed ways 7, and has a tool clamp 8 securing thereto an electromagnetic chuck 9, which is shown holding a tool 10 having broaching teeth 11 and burnishing rings 12. 13 are the reduction gears for a commutator or switch 14, from which the wire 15 leads through the conduit to the chuck 9. 16 is the ground wire.

The bed plate 2 has a bolster 17, fitted with a bushing 18, upon which is located the piece to be worked upon—18ª, as here shown. 19 is a polished guide pin which enters the bore 20 in the tool 10, when it moves down in its working stroke. 21 is a feed pipe for cutting lubricant. 22 is a pipe for compressed air, used in blowing away the chips.

The cycle of operations of the machine, beginning with the initial position as shown, follows:

At this time current is flowing through the magnetic chuck which is holding the tool in place. The piece to be operated upon is located above the bushing 18 and guide pin 19,—if need be in a chuck or fixture. With the fly wheel revolving, the slide 6 descends and the tool enters the bushing 18 over the guide pin 19. At the end of the stroke, the switch 14 breaks the current, whereupon the tool is released from the chuck and the slide ascends, leaving the tool in its bottom position. This is the second stroke of the cycle. The piece worked upon may now be removed from around the shank of the tool, which is of reduced diameter.

It should be understood that it is not feasible to return a broaching or burnishing tool through the piece which has been operated upon, when a fine quality of work is necessary.

The next downward stroke of the slide, the third stroke, allows the operator time to complete the removal of the piece worked upon. At about the end of this stroke, the switch 14 contacts, and the chuck 9, picks up the tool 10 and returns with it on the fourth stroke. At the end of this stroke it is again in the initial position of the cycle, as shown in the drawing.

Having fully described my invention, what I claim as new and desire to secure by Letters Patent, is:—

1. In a machine for reciprocating a tool, a slide, means for reciprocating said slide, an electromagnetic chuck for said slide, a tool for said chuck, a switch adapted to operate in timed relation with said slide and adapted to coöperate to connect and disconnect the tool to and from said chuck in predetermined order.

2. A machine for broaching, burnishing and the like, having means for reciprocating a tool and adapted to operate upon a cycle composed of four strokes, means adapted to release the tool through a part of the cycle of operation, and adapted to connect the tool to the said reciprocating means at a predetermined time in the cycle and retain it in operating position during two strokes of the cycle.

3. In a machine for broaching, burnishing and the like adapted to operate on a four stroke cycle, one stroke of which is a working stroke, a slide, means for reciprocating the slide, a tool holder carried by the slide and means to control said tool holder to secure a tool thereto during the working stroke and to release the tool therefrom substantially at the end of the working stroke and to re-connect the tool to the holder at the end of the third stroke of the cycle.

In testimony that I claim the foregoing as my invention I have signed my name in presence of the subscribing witnesses this 30th day of March, 1916.

HEBRON B. LAYMAN.

Witnesses:
M. C. MEYER,
R. F. KNIGHT.